(12) United States Patent
Yurt et al.

(10) Patent No.: US 11,307,533 B2
(45) Date of Patent: Apr. 19, 2022

(54) IMAGING DEVICE FOR IN-LINE HOLOGRAPHIC IMAGING OF AN OBJECT

(71) Applicant: IMEC VZW, Leuven (BE)

(72) Inventors: Abdulkadir Yurt, Heverlee (BE); Richard Stahl, Rotselaar (BE); Murali Jayapala, Kessel-Lo (BE); Geert Vanmeerbeeck, Keerbergen (BE)

(73) Assignee: IMEC VZW, Leuven (BE)

( * ) Notice: Subject to any disclaimer, the term of this patent is extended or adjusted under 35 U.S.C. 154(b) by 117 days.

(21) Appl. No.: 16/648,987

(22) PCT Filed: Sep. 19, 2018

(86) PCT No.: PCT/EP2018/075343
§ 371 (c)(1),
(2) Date: Mar. 19, 2020

(87) PCT Pub. No.: WO2019/057768
PCT Pub. Date: Mar. 28, 2019

(65) Prior Publication Data
US 2020/0285194 A1    Sep. 10, 2020

Related U.S. Application Data

(63) Continuation of application No. PCT/EP2018/075343, filed on Sep. 19, 2018.

(30) Foreign Application Priority Data

Sep. 25, 2017    (EP) .................................... 17192986

(51) Int. Cl.
*G02B 21/36*     (2006.01)
*G03H 1/04*      (2006.01)

(52) U.S. Cl.
CPC ......... *G03H 1/0443* (2013.01); *G03H 1/0465* (2013.01); *G03H 2001/0447* (2013.01);
(Continued)

(58) Field of Classification Search
CPC ............... G03H 1/0443; G03H 1/0465; G03H 2001/0447; G03H 2001/0452;
(Continued)

(56) References Cited

U.S. PATENT DOCUMENTS

2011/0150386 A1\* 6/2011 Dupuis .................. G02B 6/125
385/14
2012/0148141 A1\* 6/2012 Ozcan .................. G03H 1/0866
382/133

(Continued)

FOREIGN PATENT DOCUMENTS

EP         2657792 A1    10/2013
WO    2012094523 A2     7/2012
(Continued)

OTHER PUBLICATIONS

PCT International Search Report and Written Opinion, PCT Application No. PCT/EP2018/075343, dated Nov. 19, 2018, 13 pages.

*Primary Examiner* — Audrey Y Chang
(74) *Attorney, Agent, or Firm* — McDonnell Boehnen Hulbert & Berghoff LLP (57) ABSTRACT

Example embodiments relate to imaging devices for in-line holographic imaging of objects. One embodiment includes an imaging device for in-line holographic imaging of an object. The imaging device includes a set of light sources configured to output light in confined illumination cones. The imaging device also includes an image sensor that includes a set of light-detecting elements. The set of light sources are configured to output light such that the confined illumination cones are arranged side-by-side and illuminate (Continued)

a specific part of the object. The image sensor is arranged such that the light-detecting elements detect a plurality of interference patterns. Each interference pattern is formed by diffracted light from the object originating from a single light source and undiffracted light from the same single light source. At least a subset of the set of light-detecting elements is arranged to detect light relating to not more than one interference pattern.

20 Claims, 3 Drawing Sheets

(52) U.S. Cl.
CPC ............... *G03H 2001/0452* (2013.01); *G03H 2001/0471* (2013.01); *G03H 2222/13* (2013.01); *G03H 2222/34* (2013.01); *G03H 2222/42* (2013.01); *G03H 2222/43* (2013.01); *G03H 2222/45* (2013.01); *G03H 2222/52* (2013.01); *G03H 2223/16* (2013.01); *G03H 2226/13* (2013.01)

(58) Field of Classification Search
CPC ....... G03H 2001/0471; G03H 2222/34; G03H 2222/42; G03H 2222/43; G03H 2222/45; G03H 2223/16; G03H 2226/13; G03H 2001/0033; G03H 2001/005
USPC .............................. 359/15, 35; 382/103, 133
See application file for complete search history.

(56) References Cited

U.S. PATENT DOCUMENTS

2015/0204773 A1* 7/2015 Ozcan .................... G01B 11/24
382/103
2019/0011882 A1* 1/2019 Gusyatin ............ G01N 15/1475

FOREIGN PATENT DOCUMENTS

WO 2012094523 A3 7/2012
WO 2015167492 A1 11/2015

* cited by examiner

IMAGING DEVICE FOR IN-LINE HOLOGRAPHIC IMAGING OF AN OBJECT

CROSS-REFERENCE TO RELATED APPLICATIONS

The present application is a national stage entry of PCT/EP2018/075343 filed Sep. 19, 2018, which claims priority to EP 17192986.2 filed on Sep. 25, 2017, the contents of each of which are hereby incorporated by reference.

TECHNICAL FIELD

The present disclosure relates to holographic imaging and in particular to an imaging device for in-line holographic imaging.

BACKGROUND

Holography is a method of producing three-dimensional images of an object. Digital holography uses digital image sensors, such as a charge-coupled device (CCD) or a complementary metal-oxide-semiconductor (CMOS) image sensor.

In in-line digital holography, a light beam providing uniform illumination of an object is used for creating an interference pattern based on object light, being scattered by the object, and reference light of the light beam passing unaffected through the object. The interference pattern may be acquired by the digital image sensor and then, the acquired interference pattern may be reconstructed in order to determine an image of the object. In-line digital holography may typically be useful in microscopy applications, wherein a sample which is mostly transparent may be imaged. Thus, a large amount of light is unaffected by the object so that an interference pattern may be formed.

The light beam illuminating the object forms spatially coherent light in order to allow reconstruction of an image of the object based on the interference pattern. Thus, a light cone of the illumination is typically confined to a narrow angle. This implies that the light beam may be used only for imaging a small size object. If an enlargement of the interference pattern is desired, the light source may need to be arranged at a large distance from the object to be imaged. The distance requirement prevents imaging devices to be compact and small-size.

In R. Riesenberg, "*Pinhole-array and lensless micro-imaging with interferograms*", Deutsche Gesellschaft für angewandte Optik Proceedings 2005, use of a pinhole-array is disclosed for increasing a field of view in inline holographic imaging. The pinhole-array allows forming an illumination beam with a large extension without having a large distance between the light source and the object. However, in the experiment the light of the pinhole-array is coherent. So all sample points can interfere with each other. An extended sample generates very high spatial frequencies on the CCD, which cannot be detected by the limited size of the pixels. The detectable interferograms limit the size of the samples, but interferograms of n (number of pinholes) samples are superposed. For reconstruction a sequence of interferograms is generated. The limit of the number of pinholes used is determined by the detectable signal and contrast differences in the signals generated by the superposition.

It may be desired to achieve an increased field of view in in-line holographic imaging without requiring a complex reconstruction of the holographic images.

SUMMARY

The disclosure provides an imaging device for in-line holographic imaging, which may be provide a compact set-up while providing a large field of view.

This and other features of the present disclosure are at least partially met by the embodiment defined in the independent claim. Additional embodiments are set out in the dependent claims.

According to a first aspect, there is provided an imaging device for inline holographic imaging of an object, the imaging device comprising: a set of light sources, wherein each light source is configured to output light in a confined illumination cone; an image sensor, which comprises a set of light-detecting elements for detecting incident light, wherein the set of light sources are configured to output light such that the confined illumination cones of the light sources in the set of light sources are arranged side-by-side and the illumination cone of each light source illuminates a specific part of the object; and wherein the image sensor is arranged such that the light-detecting elements detect a plurality of interference patterns, wherein each interference pattern is formed by diffracted light from the object originating from a single light source in the set of light sources and undiffracted light from the same single light source, wherein at least a sub-set of light-detecting elements is arranged to detect light relating to not more than one interference pattern.

In some embodiments, a multiplexing scheme is provided such that a set of light sources are used for illuminating the object. Each of the set of lights sources operates independently in order to illuminate a portion of the object and form an interference pattern on the image sensor. Thus, the image sensor may be configured to detect a plurality of interference patterns, which each comprises information about a specific portion of the object. This implies that it is possible to reconstruct an image of the object based on separate handling of the interference patterns and there is no need of complex processing and/or multiple exposures in order to separate contribution from different light sources to the light detected in a single light-detecting element.

The set-up of multiplexed light sources further allows arranging the set of light sources close to the object, as the field of view of each light source in the set of light sources need not be very large. This implies that the imaging device may be very compact, as there is no requirement of a large distance between the object and the light source.

As used herein, the term "a set of light sources" should be construed as a set of positions from which light transmitted towards the object originates. Thus, light need not necessarily be generated in the actual position forming the light source. Rather, light may first be guided to the position and emitted therefrom towards the object. Thus, the light source may be formed as a pinhole or end of an optical fiber, from which light is transmitted towards the object. The light emitted from the set of light sources may actually be generated from a common light generating device and then be guided to the plurality of light sources in the set of light sources.

It should be realized that the light may be emitted as light pulses, which may or may not be synchronized for being simultaneously emitted by the set of light sources. Use of light pulses may avoid or reduce motion blur due to a moving object. However, the set of light sources may alternatively be configured to continuously emit light.

As used herein, the term "object" should be construed as any shape or form which is arranged in an object plane and imaged onto an image plane. Thus, the object does not necessarily need to be a single, physical entity. Rather, the "object" may e.g. be formed from a plurality of separate particles that which may be imaged onto the image sensor.

The object may be a large tissue sample or another large physical entity, which may be imaged onto the image sensor. Thus, the illumination cone of each light source may illuminate a specific part of a tissue sample, such that different parts of the sample may be illuminated by illumination cones from different light sources.

However, the object may instead be formed from a plurality of separate parts or entities. For instance, the object may comprise one or more fluidic channels in which a plurality of cells or particles are being transported. The object may thus comprise a plurality of particles and the illumination cone of each light source illuminating a specific part of the object may imply that the illumination cone of each light source may illuminate different particles in the one or more fluidic channels.

In other words, according to an embodiment of the first aspect, there is provided an imaging device for in-line holographic imaging of one or more particles, the imaging device comprising: a set of light sources, wherein each light source is configured to output light in a confined illumination cone; an image sensor, which comprises a set of light-detecting elements for detecting incident light, wherein the set of light sources are configured to output light such that the confined illumination cones of the light sources in the set of light sources are arranged side-by-side and the illumination cone of each light source illuminates a specific part of the one or more particles; and wherein the image sensor is arranged such that the light-detecting elements detect a plurality of interference patterns, wherein each interference pattern is formed by diffracted light from the one or more particles originating from a single light source in the set of light sources and undiffracted light from the same single light source, wherein at least a sub-set of light-detecting elements is arranged to detect light relating to not more than one interference pattern.

For instance, the one or more particles may be cells, wherein the cells may be arranged to be transported through one or more fluidic channels while being imaged by the imaging device.

According to an embodiment, the imaging device may be used for imaging a plurality of fluidic channels. The imaging device may thus be configured to image an object comprising a plurality of fluidic channels with a plurality of cells in each fluidic channel. According to an alternative, the imaging device may be used for imaging a single broad fluidic channel and the imaging device may be configured to image an object comprising a large quantity of cells within the broad fluidic channel. Thus, the imaging device may be used for imaging a plurality of cells on different parts of the image sensor, such that the imaging device may provide a high throughput of imaging of cells. This may provide fast cell analysis, e.g. for a cell counter or a cell sorter.

It should also be realized that a plurality of imaging devices may be used in parallel. For instance, one imaging device may be configured to image a first fluidic channel so as to enable imaging a plurality of cells on different parts of the image sensor, while another imaging device may be configured to image a second fluidic channel, which may be arranged on a common substrate with the first fluidic channel.

According to an embodiment, the imaging device comprises an integrated photonic circuit, which comprises a waveguide for guiding a light beam, wherein the waveguide comprises a plurality of branches for guiding the light beam to a plurality of light output positions, which form a plurality of light sources in the set of light sources.

The use of an integrated photonic circuit may enable a compact set-up of the set of light sources, while allowing the light sources to be arranged very close to each other. Thus, the illumination cones of the light sources may be very close to each other, which may allow arranging the set of light sources close to the object while still illuminating the entire object.

The integrated photonic circuit may also provide an accurate control of relations between the light sources. The integrated photonic circuit may be manufactured in large volumes while providing the same relation between the light sources in the set of light sources. Hence, the use of an integrated photonic circuit may facilitate manufacture of the imaging device in large volumes.

According to another embodiment, the imaging device comprises a set of optical fibers for guiding light beams, wherein ends of the array of optical fibers form a plurality of light sources in the set of light sources.

Optical fibers may provide accurate control of transmission of light. Optical fibers may be very thin, which may allow arranging a plurality of optical fibers close to each other. Thus, the use of optical fibers may also allow the light sources to be arranged very close to each other, allowing the set of light sources to be arranged close to the object.

According to yet another embodiment, the imaging device comprises at least one optically opaque substrate, which comprises a plurality of apertures through which light is transmitted, whereby the apertures form a plurality of light sources in the set of light sources.

The apertures may be formed as actual through-going holes in the substrate or by a material that is configured to transmit light of an appropriate wavelength.

According to an embodiment, a distance between a light source in the set of light sources and the object is in a same order of magnitude as a distance between the object and the image sensor. This implies that a size of the image device is not mainly set by a required distance between the set of light sources and the object. According to another embodiment, the distance between a light source in the set of light sources and the object may even be smaller than a distance between the object and the image sensor.

According to an embodiment, the set of light sources forms a two-dimensional array of light sources. This implies that a field of view may be expanded in an entire plane in which the object is arranged. Thus, the object may have a large size in two dimensions and may still be imaged by a set of light sources that may be arranged close to the object.

According to another embodiment, the set of light sources are arranged in a row to form a one-dimensional arrangement of the set of light sources. A one-dimensional arrangement may provide a less complex set-up of the light sources compared to a two-dimensional array. The one-dimensional arrangement may be sufficient in some applications for illuminating an entire object.

According to an embodiment, adjacent interference patterns are partially overlapping on the image sensor such that a sub-set of light-detecting elements is arranged to detect light relating to two adjacent interference patterns.

This implies that the illumination cones from the light sources may be arranged so close to each other that the entire object, e.g. an entire area of interest in an object plane, may be imaged and there are no parts of the object between illumination cones that will not be imaged. The partial overlap of the adjacent interference patterns may imply that there may be regions of light-detecting elements, which are arranged to detect light from two adjacent interference patterns. However, between such regions, there will still be regions of no overlap between adjacent interference patterns, such that at least a sub-set of light-detecting elements is arranged to detect light relating to not more than one interference pattern. The regions of no overlap may allow relatively straightforward reconstruction of a part of the object, as the detected interference pattern is based solely on light from a single light source.

According to an embodiment, a first light source in the set of light sources is configured to emit light of a first wavelength and a second light source in the set of light sources adjacent to the first light source is configured to emit light of a second wavelength.

This implies that the set of light sources may be configured to emit light of a plurality of wavelengths (at least two). The plurality of wavelengths may be used for distinguishing between interference patterns based on different wavelengths, e.g. by different light-detecting elements being sensitive to different wavelengths (such as by the light-detecting elements being associated with filters). When interference patterns may be distinguished using different wavelengths, the interference patterns may be allowed to be arranged closer to each other on the image sensor, and even partially overlapping without losing a possibility of simply reconstructing an image of the object by considering a single interference pattern at a time. Also, the use of different wavelengths may allow simultaneously illuminating the object using all the light sources in the set of light sources, while still allowing the entire interference patterns associated with each light source to be distinguished.

According to an embodiment, first light sources and second light sources are alternately arranged in the set of light sources.

This implies that next to a first light source, there will always be a second light source. Thus, a set-up in which the first and second light sources are alternately arranged may prevent interference patterns based on the same wavelength to be overlapping on the image sensor.

According to an embodiment, interference patterns based on the first wavelength do not overlap on the image sensor and interference patterns based on the second wavelength do not overlap on the image sensor, such that each light-detecting element is arranged to detect light relating to not more than one interference pattern based on the first wavelength or based on the second wavelength.

Thus, the imaging device is configured such that interference patterns based on the same wavelength will be arranged far from each other on the image sensor and, hence, there is no risk that interference patterns based on the same wavelength will overlap. Since no light-detecting element will detect light relating to two interference patterns of the same wavelength, the interference patterns may be distinguished from each other in the light detected by the set of light-detecting elements.

According to an embodiment, central axes of the illumination cones are parallel.

This implies that illumination light from the light sources will propagate in parallel towards the object. Thus, a relation between the illumination cones may be well-defined and the system may be easily set up such that the illumination cones will form interference patterns that are non-overlapping or only slightly overlapping on the image sensor.

According to an embodiment, each light source in the set of light sources is configured to output laser light. This implies that the light sources will provide illumination light with a high spatial coherence, such that high quality interference patterns will be formed.

According to an alternative embodiment, the light sources comprise a small pinhole or aperture through which light is guided, such that light emitted from the pinhole or aperture will have a high spatial coherence. In such case, the light need not be laser light but may instead be generated e.g. by a light-emitting diode (LED).

According to an embodiment, the imaging device further comprises a processing unit, which is configured to process information of detected interference patterns from the set of light-detecting elements of the image sensor to reconstruct a holographic image of the object.

Thus, the imaging device may be configured to calculate a reconstruction of a holographic image of the object based on the detected interference patterns. This implies that the imaging device may output a holographic image of the object.

The processing unit may be arranged in a common housing with the light sources and the image sensor, but may alternatively be arranged anywhere else. The processing unit of the imaging device may thus be connected, through a wired or wireless connection to the image sensor for receiving information on the detected interference patterns.

The imaging device may alternatively be configured to output the detected interference patterns, possibly processed somewhat in the imaging device, to an external unit that may then perform the calculations for reconstruction of a holographic image of the object.

Since the interference patterns are formed based on separate illumination light cones, each interference pattern may be separately processed and holds isolated information of a portion of the object. Each interference pattern may thus be separately processed in order to calculate a portion of the holographic image of the object. The portions of the holographic image may then be stitched together in order to form a holographic image of the entire object, e.g. an entire area of interest in an object plane which may comprise one or more physical entities, such as single large sample or a plurality of small particles.

According to an embodiment, the light sources in the set of light sources are configured to simultaneously illuminate the object.

Since the interference patterns detected by the light-detecting elements may be distinguished from each other, it is possible to simultaneously illuminate the object using all the light sources, while still enabling a relatively straightforward processing of the interference patterns in order to separately reconstruct portions of the holographic image of the object. By using simultaneous illumination, all parts of the object are illuminated in the same exposure time, any blur due to movement of the object between exposure times may be avoided.

According to another embodiment, the light sources in the set of light sources are configured to sequentially illuminate the object.

This implies that all light sources do not simultaneously illuminate the object. However, several light sources may simultaneously illuminate the object during a part of the sequence. Thus, for instance, all light sources in a set of first light sources may simultaneously illuminate the object in a first part of the sequence, while all light sources in a set of second light sources may simultaneously illuminate the object in a second part of the sequence.

The sequential illumination may ensure that the interference patterns may be easily distinguished from each other, e.g. by no overlap of the interference patterns occurring on the image sensor based on the light sources that are simultaneously illuminating the object. Thus, even if adjacent interference patterns will be arranged to partially overlap on the image sensor, each light-detecting element will only detect light belonging to a single interference pattern at a time. This implies that the reconstruction of the holographic image of the object may be facilitated.

According to an embodiment, the imaging device further comprises a housing having a withdrawable receiver, wherein the withdrawable receiver is configured to be withdrawable in order to protrude from the housing and present a position for placing an object in the receiver and is further configured to be insertable into the housing for placing the object in the receiver in a prepared set-up for in-line holographic imaging of the object.

This implies that the imaging device may provide a well-defined set-up in the housing and that a user may simply introduce a sample by placing the sample in the receiver, whereby the sample will be appropriately arranged in relation to the light sources and the image sensor. Thus, the imaging device may be very straightforward to use and to prepare an optical set-up.

According to a second aspect, there is provided a diagnostic equipment for analysis of an object, the diagnostic equipment comprising an imaging device according to the first aspect.

Effects and features of this second aspect are largely analogous to those described above in connection with the first aspect. Embodiments mentioned in relation to the first aspect are largely compatible with the second aspect.

By arranging the imaging system in a diagnostic equipment, an inexpensive and straightforward set-up, which may be used for high-quality holographic imaging of objects, may also be integrated within a device for providing a measure of an object or a diagnostic result based on analysis of holographic image(s) acquired by the imaging device. For instance, the diagnostic equipment may be set up for use in biomedical purposes.

According to an embodiment, the object is a body fluid sample. The diagnostic equipment could thus for example be used for blood cell counting, identification or classification of cells.

However, it should be realized that the imaging device may be used in many different applications. The imaging device may be used in high-throughput detection of various micron scale (or smaller) biological particles (e.g. viruses, bacteria, algae, pollens, parasite eggs, animal/human cells such as sperms, blood cells, as well as exosomes) in various biological media (blood, saliva, urine, breast milk, tears, semen) or synthetic media (cell cultures, buffer solutions (such as PBS)) etc.

The imaging device may in other applications be used for imaging and quantifying the presence of micron scale inorganic contaminants (nanoparticles, microparticles, fibers) in air, water, milk, industrial oils, and lubricants.

The imaging device may in further applications be used for imaging large-scale objects (millimeter or larger) for quality control inspection applications. Such inspection may for instance be used in inspection of optical lenses, semiconductor and glass wafers, or liquid crystal displays (LCDs). The inspection may be performed for defect analysis, yield monitoring, counterfeit detection, etc.

BRIEF DESCRIPTION OF DRAWINGS

The above, as well as additional features will be better understood through the following illustrative and non-limiting detailed description of example embodiments, with reference to the appended drawings. In the drawings like reference numerals will be used for like elements unless stated otherwise.

DETAILED DESCRIPTION

Detailed embodiments will now be described with reference to the drawings.

Figure 1:
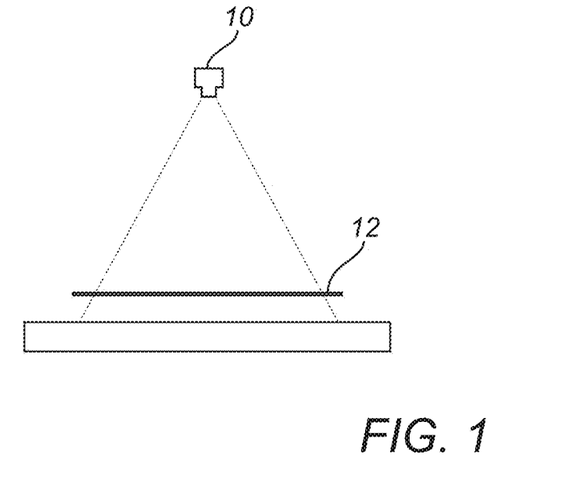
FIG. 1 is a schematic illustration of a conventional set-up for in-line holographic imaging.

The disclosure relates to in-line digital holographic imaging. As illustrated in FIG. 1, efforts of miniaturizing in-line holographic imaging platforms have been primarily hampered by limitations imposed by the nature of the conventional illumination schemes. Typically, in-line holographic imaging relies on generating a point source 10 by filtering light beams using small apertures, such as pinholes, waveguides, single mode fibers, etc. to create a uniform illumination of the object 12. Such point sources 10 thus inherently have a limited numerical aperture, which requires the objects 12 to be situated sufficiently far from the aperture in order for the illumination beam to uniformly illuminate the whole object 12 of interest. The confined angular nature of the illumination thus leads to a direct correlation between a field of view of imaging and a compactness of the system in practice, where the compactness of the system is mainly limited by a distance between the source 10 and the object 12.

Figure 2:
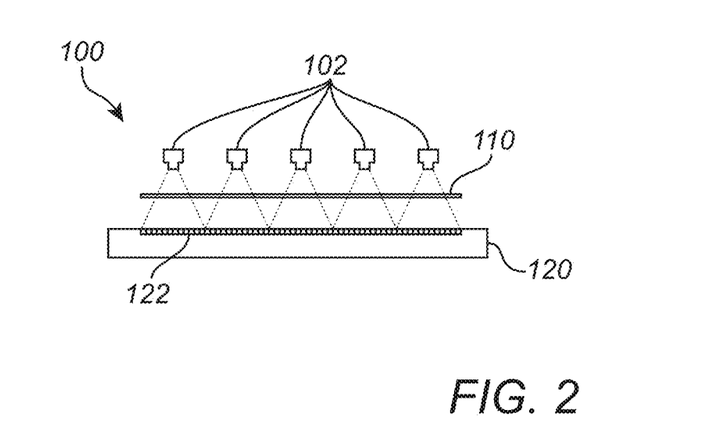
FIG. 2 is a schematic view of an imaging device, according to example embodiments.

Referring now to FIG. 2, a first embodiment of an imaging device 100 will be described. The imaging device 100 makes use of a multiplexing approach in order to enable miniaturizing the imaging device 100, as a distance between a light source 102 and an object 110 may be dramatically decreased, while allowing a large field of view of the imaging device 100.

The imaging device 100 comprises a set of light sources 102. Each light source 102 may be configured to output a spatially coherent light beam. The light beam will be output in a confined illumination cone such that even though the light sources 102 may be arranged very close to each other, each light source 102 may be configured to illuminate a specific part of the object 110, wherein adjacent illumination cones do not overlap at all or only partially overlap.

The object 110 is thus illuminated by an illumination cone and the illumination light is partly diffracted by the object 110 so as to form object light and partly unaffected by the object 110 in order to form reference light. The object light and the reference light may thus interact and may form an interference pattern, which may be acquired by an image sensor 120. The diffraction of object light is distributed onto the image sensor 120.

The image sensor 120 may comprise a set of light-detecting elements 122 that may together detect a two-dimensional distribution of light intensity as a representation of the interference pattern. An image of a specific part of the object 110, as illuminated by an illumination cone may then be reconstructed by applying a complex wave equation to the detected interference pattern for forming a focused image in an object plane from the detected light in an image plane in which the image sensor 120 is arranged.

The image sensor 120 may for example be implemented as a charge-coupled device (CCD) or a complementary metal-oxide-semiconductor (CMOS) image sensor. Analog output from the light-detecting elements 122 may pass an analog-to-digital converter, such that the image sensor 120 may output a digital representation of detected light.

The plurality of light sources 102 in the set of light sources may thus form a plurality of interference patterns on the image sensor 120 based on each of the illumination cones interacting with a specific part of the object 110. Thus, the light-detecting elements 122 of the image sensor 120 may detect a plurality of interference patterns.

The imaging device 100 is configured such as to enable distinguishing between different interference patterns being detected. There are several different manners in which the interference patterns may be distinguished from each other, as described below. By enabling each interference pattern to be isolated or distinguished from the detection made by the image sensor 120, it is possible to process each interference pattern separately in order to reconstruct a holographic image of the object 110 with relative ease.

The interference patterns may be distinguished from each other by the set of light sources 102 being arranged to form interference patterns that are not overlapping on the image sensor 120. Thus, each interference pattern may be separately detected by a corresponding set of light-detecting elements 122 on the image sensor 120.

As an alternative, the interference patterns may be distinguished from each other by different wavelengths of light being emitted by different light sources 102. Further, the light-detecting elements 122 of the image sensor 120 may be configured to selectively detect light based on wavelength, e.g. by different filters being associated with different light-detecting elements 122.

Hence, an interference pattern based on a specific wavelength may be detected by the light-detecting elements 122 being configured to detect such wavelength, whereas another interference pattern based on another specific wavelength may be detected by other light-detecting elements 122 being configured to detect such other wavelength. If there is a plurality of light sources 102 that emit a common wavelength, these light sources 102 may be separately arranged such that interference patterns based on a common wavelength do not overlap on the image sensor 120.

As another alternative, the light sources 102 may be configured to sequentially illuminate the object 110. Hence, the interference patterns may not be formed at the same time on the image sensor 120 and the interference patterns may be distinguished based on a time at which the interference pattern is detected. The light sources 102 may be grouped such that all light sources 102 within a group may simultaneously illuminate the object 110, whereas different groups may be sequentially activated. The interference patterns of different light sources 102 within a group may not overlap on the image sensor 120 in order to allow distinguishing such interference patterns that are simultaneously detected. A sequence for illuminating the entire object 110 may be short in order to avoid motion blur due to the object 110 moving during the sequence. Thus, the set of light sources 102 may be divided into very few groups, such as two groups, with each group comprising only light sources 102 that do not generate overlapping interference patterns.

Also, it should be realized that any combination of the above scheme may be contemplated, such as using light sources 102 configured to emit different wavelengths as well as sequential illumination for some of the light sources.

Thanks to the use of a set of light sources 102 which each separately illuminates a portion of the object 110, a size of the illumination cone from a single light source 102 need not be very large at an object plane. This implies that the light source 102 may be arranged close to the object 110 and, hence, that the imaging device 100 may be compact. As illustrated in FIG. 2, the imaging device 100 may be configured having a distance $d_1$ between the light source 102 and the object 110 that is approximately equal to a distance $d_2$ between the object 110 and the image sensor 120. If no overlap of interference patterns is allowed, the field of view (i.e. the illuminated part of the object) as a ratio of a size of the image sensor 120 is set to $d_1^2/(d_1+d_2)^2$. Thus, if $d_1$ is equal to $d_2$, 25% of the object 110 will be illuminated by the set of light sources 102, providing imaging of a large part of an object 110 while having a small distance between the light sources 102 and the object 110 so as to keep the imaging device 100 compact. If a plurality of wavelengths is used and/or a sequential illumination is used, a full field of view in relation to the size of the image sensor 120 may be imaged with the set of light sources 102 being arranged close to the object 110.

Figure 3:
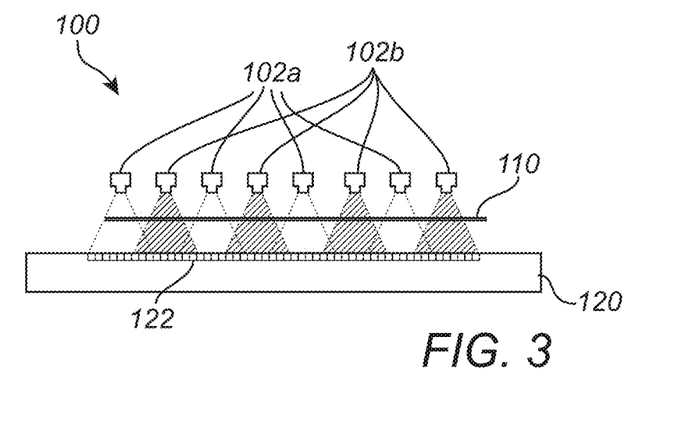
FIG. 3 is a schematic view of an imaging device, according to example embodiments.

In FIG. 3, an embodiment using first light sources 102a that emit a first wavelength and second light sources 102b that emit a second wavelength is shown. The first light sources 102a and the second light sources 102b are alternately arranged. Thus, each first light source 102a may have second light sources 102b as closest neighbors. This implies that, even if the interference patterns based on light from adjacent light sources 102 partially overlap, the interference patterns may be distinguished from each other since the interference patterns are formed at different wavelengths.

Figure 4:
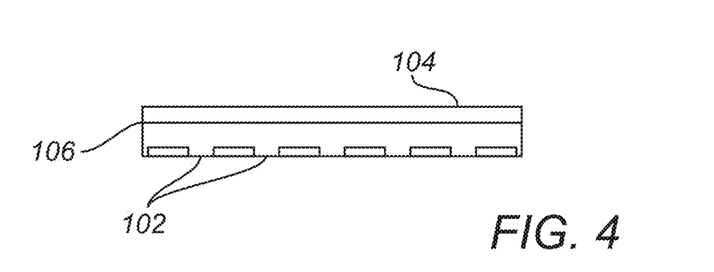
FIG. 4 is a schematic view of an integrated photonic circuit providing a set of light sources, according to example embodiments.

Referring now to FIG. 4, an arrangement is disclosed for providing a set of light sources 102, wherein the light sources 102 are arranged close to each other. The imaging device 100 may thus comprise an integrated photonic circuit 104, which may be form a compact, miniaturized structure for controlled guiding of light.

The integrated photonic circuit 104 may or may not include a light generating device, such as a laser source. The integrated photonic circuit 104 may further comprise one or more waveguides 106 for guiding a light beam from the light generating device through the structure of the integrated photonic circuit 104. The waveguide 106 may include a plurality of branches in order to split the light beam to a plurality of light output positions, e.g. apertures in the integrated photonic circuit 104, for forming the set of light sources 102.

The use of an integrated photonic circuit 104 may allow the set of light sources 102 to be arranged in close proximity to each other. Small waveguides 106 may be formed in an integrated, compact structure and may thus allow the apertures to be at close distances from each other.

The integrated photonic circuit 104 may also be configured to guide light of two or more different wavelengths. Thus, the schematic illustration of the first light sources 102a and the second light sources 102b in FIG. 3 may be implemented using a single integrated photonic circuit 104.

It should be realized that closely spaced arrays of light sources 102 may be implemented in other ways as well. For instance, a set of thin optical fibers may be used, wherein ends of the thin optical fibers at which light is output may be arranged close to each other. The optical fibers may be arranged to transmit light of a common wavelength and input ends of the optical fibers may thus be connected to receive light from a common light generating device. However, the optical fibers may also or alternatively be arranged to transmit light of different wavelengths, e.g. because the input ends of the optical fibers are connected to receive light from two or more different light generating devices.

According to another alternative, the imaging device 100 may comprise one or more optically opaque substrates, which may comprise spaced-apart structures for allowing light to be transmitted through the substrate. The structures allowing light to be transmitted may be formed from transparent material, which may be wavelength-selective in that the material is only transparent for a defined wavelength range. Alternatively, the structures allowing light to be transmitted may be formed as holes or apertures in the substrate.

The optically opaque substrate may be combined with a waveguide arranged above the structure in order to guide light so as to provide light uniformly over the substrate such that light may be selectively transferred from the waveguide through transmissive structures in the substrate towards the object 110.

The light sources 102 may be arranged such that the light from the light sources 102 is arranged to propagate in parallel relation. Thus, the central axes of the illumination cones may extend in parallel directions. This implies that illumination light from the light sources 102 will propagate in parallel towards the object. Thus, a relation between the illumination cones may be well-defined and the system may be easily set up such that the illumination cones will form interference patterns that are non-overlapping or only slightly overlapping on the image sensor 120.

The parallel relation of the illumination cones may be easily achieved by arranging the set of light sources 102 to emit light from a single plane, such as by using a photonic integrated circuit 104. However, the illumination cones may be arranged in parallel relation even if the light sources 102 are not arranged in a common plane. It should also be realized that the light sources 102 need not necessarily emit light in exactly parallel directions. The interference patterns may still be formed on the image sensor 120, so as to at most partially overlap, whereby the interference patterns may be separately processed in order to reconstruct a holographic image of the object 110 with relative ease.

The set of light sources 102 may be arranged in a row to form a one-dimensional arrangement of the set of light sources 102. However, the set of light sources 102 may alternatively form a two-dimensional array of light sources 102 for extending an area of the object 110 being imaged in two dimensions.

Figure 5:
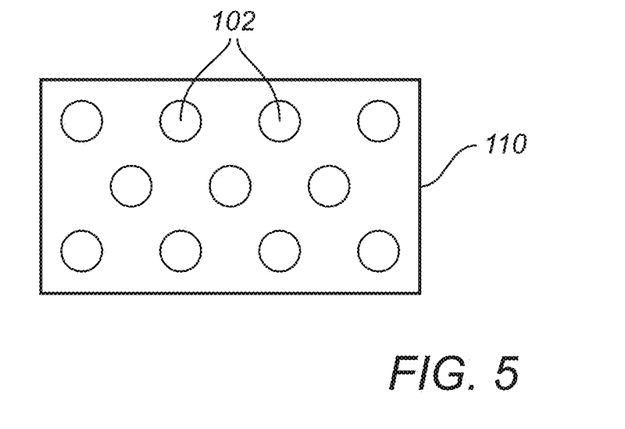
FIG. 5 is a schematic view of a two-dimensional array of light sources, according to example embodiments.

In FIG. 5, a top view of an array of light sources 102 is shown. As illustrated in FIG. 5, the light sources 102 in adjacent rows may be displaced in relation to each other so as to illuminate a large area of the object 110 while having a small overlap of the interference patterns.

The imaging device 100 could be arranged as separate parts. The separate parts may be set up in a fixed relation to each other during installation of the imaging device 100. Alternatively, an experienced user could use the separate parts to alter the set-up of the imaging device 100, e.g. to adapt the imaging device 100 for imaging different types of objects 110.

Figure 6:
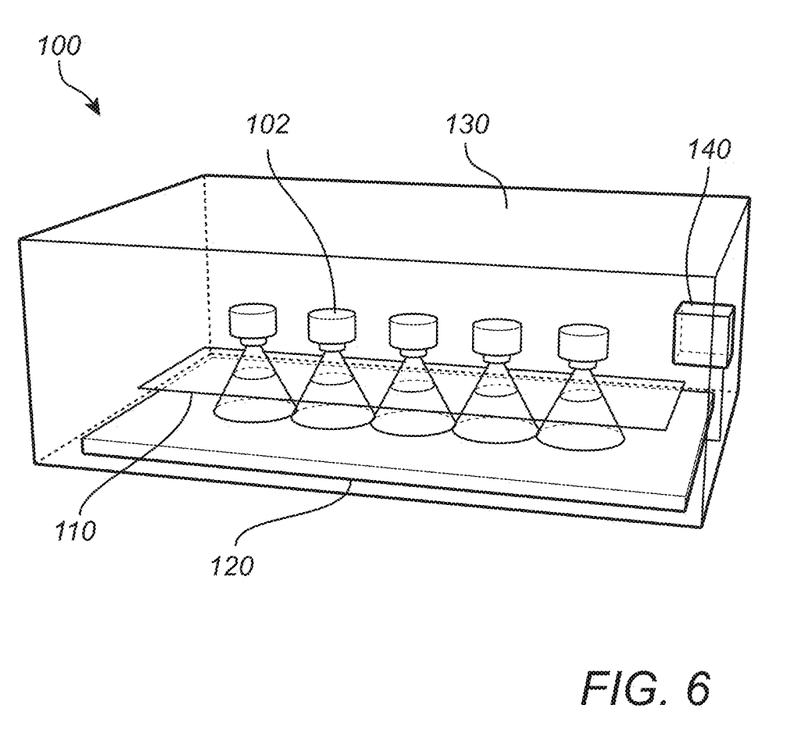
FIG. 6 is a schematic view of an imaging device comprising components arranged in a common housing, according to example embodiments.

As illustrated in FIG. 6, the imaging device 100 could alternatively comprise a housing 130, wherein a relation between the set of light sources 102, a position of the object 110 and the image sensor 120 is well-defined. The set of light sources 102 and the image sensor 120 may be mounted in the housing 130 so as to provide a fixed and well-controlled relation between the light sources 102 and the image sensor 120.

The housing 130 may further comprise a withdrawable receiver, which may be moveable to protrude at least partly from the housing 130. Thus, the withdrawable receiver may allow an object 110 to be imaged to be easily placed on the receiver. Further, the withdrawable receiver may be moveable to accurately bring the object 110, such as a sample holder comprising a sample, to an appropriate position in the housing 130 for being illuminated by the set of light sources 102 for holographic imaging of the object 110.

The imaging device 100 could also be part of an apparatus or instrument, which comprises other components. For instance, the imaging device 100 could be arranged in a camera application, wherein a display is provided for enabling presenting of the digitally reconstructed optical image of the object 110 to a user.

The imaging device 100 could also be arranged in a measurement instrument, which may be arranged to pre-process the object 110 to prepare it for imaging and/or make other measurements on the object 110 before the object 110 is arranged to be illuminated by the set of light sources 102 so as to allow the interference patterns to be detected.

The imaging device 100 may further comprise a processing unit 140. The processing unit 140 may be configured to receive the interference patterns detected by the image sensor 120. The processing unit 140 may further be configured to reconstruct an optical image of the object 110. The processing unit 140 may thus determine the optical image corresponding to the detected interference patterns, using any type of calculations as would be understood by a person skilled in the art.

The processing unit 140 may be any type of unit able to process information. The processing unit 140 may be a general-purpose processing unit, such as a central processing unit (CPU), which may be loaded with a computer program product in order to allow the processing unit 140 to perform the desired operations. The processing unit 140 may alternatively be a special-purpose circuitry for providing only specific logical operations. Thus, the processing unit 140 may be provided in the form of an application-specific integrated circuit (ASIC), an application-specific instruction-set processor (ASIP), a field-programmable gate array (FPGA), or a digital signal processor (DSP).

The processing unit 140 may be configured to both provide processing of the interference patterns and also provide control of components of the imaging device 100, such as for controlling an illumination sequence to be performed by the set of light sources 102. Thus, the processing unit 140 may comprise software program(s) for configuring the processing unit 140 to control the set of light sources 102 and/or the image sensor 120 and also for processing the detected interference patterns.

In one embodiment, a software may be provided for allowing an operator to control any component in the imaging device 100 and for also making any further analysis of the optical image that may be reconstructed of the object 110. The operator may thus control the imaging device 100 through such software via e.g. an interface to a computer running the software.

It should also be realized that the processing unit 140 need not necessarily be arranged in a common housing 130 with the set of light sources 102 and the image sensor 120. On the contrary, the processing unit 140 may be remotely arranged. In fact, an external unit may be used for processing of the interference patterns. The imaging device 100 may thus comprise a communication unit within the housing 130 for communicating detected interference patterns to an external unit, in which the reconstruction of the holographic image may take place.

As mentioned above, the imaging device could be arranged in a measurement instrument, which may further be arranged to determine a measure of the object 110. This measure may be determined based on processing of the detected interference patterns or analyzing/processing analysing/processing the reconstructed optical image of the object 110. The determination of the measure may be performed in the processing unit 140 described above, which may be a processing unit 140 that controls functionality of all components of the measurement instrument.

The measurement instrument could form a diagnostic equipment, allowing e.g. for biomedical diagnosis to be performed. The diagnostic device could be arranged to perform holographic imaging, such as holographic microscopy on a sample of a body fluid. This could allow the diagnostic device to determine measure that may have diagnostic meaning, such as counting blood cells in the sample, identifying cells or classifying cells.

The measurement instrument may alternatively be used in industrial applications, such as for inspection of products, e.g. for checking product quality in a manufacturing line.

In the above the inventive concept has mainly been described with reference to a limited number of examples. However, as will be readily appreciated, other examples than the ones disclosed above are equally possible within the scope of the disclosure, as defined by the appended claims.

The invention claimed is:

1. An imaging device for in-line holographic imaging of an object, comprising:
   a set of light sources, wherein each light source is configured to output light in a confined illumination cone; and
   an image sensor comprising a set of light-detecting elements for detecting incident light,
   wherein the set of light sources are configured to output light such that the confined illumination cones of the light sources are arranged side-by-side and the confined illumination cone of each light source illuminates a specific part of the object,
   wherein first light sources in the set of light sources are configured to emit light of a first wavelength and second light sources in the set of light sources are configured to emit light of a second wavelength,
   wherein the first light sources and the second light sources are alternatingly arranged in the set of light sources such that each first light source has second light sources as closest neighbors,
   wherein the image sensor is arranged such that the light-detecting elements detect a plurality of interference patterns,
   wherein each interference pattern is formed by diffracted light from the object originating from a single light source in the set of light sources and undiffracted light from the same single light source,
   wherein adjacent parts of the object are illuminated by light of the first wavelength and light of the second wavelength in a spatially alternating fashion, and
   wherein at least a subset of the set of light-detecting elements is arranged to detect light relating to not more than one interference pattern based on wavelengths of the respective interference patterns.

2. The imaging device according to claim 1, further comprising an integrated photonic circuit, wherein the integrated photonic circuit comprises a waveguide for guiding a light beam, and wherein the waveguide comprises a plurality of branches for guiding the light beam to a plurality of light output positions that form a plurality of light sources in the set of light sources.

3. The imaging device according to claim 1, further comprising an array of optical fibers for guiding light beams, wherein ends of the array of optical fibers form a plurality of light sources in the set of light sources.

4. The imaging device according to claim 1, wherein a distance between a light source in the set of light sources and the object is in a same order of magnitude as a distance between the object and the image sensor.

5. The imaging device according to claim 1, wherein the set of light sources forms a two-dimensional array of light sources.

6. The imaging device according to claim 1, wherein adjacent interference patterns are partially overlapping on the image sensor such that a subset of light-detecting elements is arranged to detect light relating to two adjacent interference patterns.

7. The imaging device according to claim 1, wherein the subset of the set of light-detecting elements arranged to detect light relating to not more than one interference pattern comprises light-detecting elements having different filters.

8. The imaging device according to claim 1, wherein the light sources in the set of light sources are configured to sequentially illuminate the object, and wherein the sequential illumination sequence is short to avoid motion blur due to movement of the object.

9. The imaging device according to claim 1, wherein interference patterns based on the first wavelength do not overlap on the image sensor and interference patterns based on the second wavelength do not overlap on the image sensor, such that each light-detecting element is arranged to detect light relating to not more than one interference pattern based on the first wavelength or based on the second wavelength.

10. The imaging device according to claim 1, wherein central axes of the illumination cones are parallel.

11. The imaging device according to claim 1, further comprising a processing unit, wherein the processing unit is configured to process information of detected interference patterns from the set of light-detecting elements of the image sensor to reconstruct a holographic image of the object.

12. The imaging device according to claim 1, wherein the light sources in the set of light sources are configured to simultaneously illuminate the object.

13. The imaging device according to claim 1, wherein the light sources in the set of light sources are configured to sequentially illuminate the object.

14. The imaging device according to claim 1, further comprising a housing having a withdrawable receiver, wherein the withdrawable receiver is configured to be withdrawable in order to protrude from the housing and present a position for placing an object in the withdrawable receiver, and wherein the withdrawable receiver is configured to be insertable into the housing for placing the object in the withdrawable receiver in a prepared set-up for in-line holographic imaging of the object.

15. A diagnostic equipment for analysis of an object, comprising:

an imaging device for in-line holographic imaging of the object, wherein the imaging device comprises:
a set of light sources, wherein each light source is configured to output light in a confined illumination cone; and
an image sensor comprising a set of light-detecting elements for detecting incident light,
wherein the set of light sources are configured to output light such that the confined illumination cones of the light sources are arranged side-by-side and the confined illumination cone of each light source illuminates a specific part of the object,
wherein first light sources in the set of light sources are configured to emit light of a first wavelength and second light sources in the set of light sources are configured to emit light of a second wavelength,
wherein the first light sources and the second light sources are alternatingly arranged in the set of light sources such that each first light source has second light sources as closest neighbors,
wherein the image sensor is arranged such that the light-detecting elements detect a plurality of interference patterns,
wherein each interference pattern is formed by diffracted light from the object originating from a single light source in the set of light sources and undiffracted light from the same single light source,
wherein adjacent parts of the object are illuminated by light of the first wavelength and light of the second wavelength in a spatially alternating fashion, and
wherein at least a subset of the set of light-detecting elements is arranged to detect light relating to not more than one interference pattern based on wavelengths of the respective interference patterns.

16. The diagnostic equipment according to claim 15, wherein the imaging device further comprises an integrated photonic circuit, wherein the integrated photonic circuit comprises a waveguide for guiding a light beam, and wherein the waveguide comprises a plurality of branches for guiding the light beam to a plurality of light output positions that form a plurality of light sources in the set of light sources.

17. The diagnostic equipment according to claim 15, wherein the imaging device further comprises an array of optical fibers for guiding light beams, and wherein ends of the array of optical fibers form a plurality of light sources in the set of light sources.

18. The diagnostic equipment according to claim 15, wherein a distance between a light source in the set of light sources and the object is in a same order of magnitude as a distance between the object and the image sensor.

19. The diagnostic equipment according to claim 15, wherein the set of light sources forms a two-dimensional array of light sources.

20. The diagnostic equipment according to claim 15, wherein adjacent interference patterns are partially overlapping on the image sensor such that a subset of light-detecting elements is arranged to detect light relating to two adjacent interference patterns.

* * * * *